Aug. 18, 1959  S. C. JORDAN  2,900,480
ELECTRIC RANGE
Filed Nov. 14, 1958
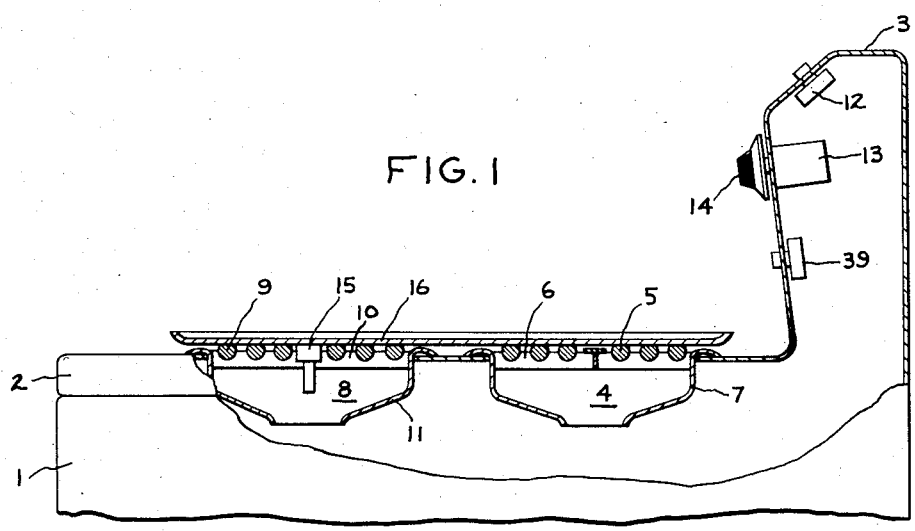
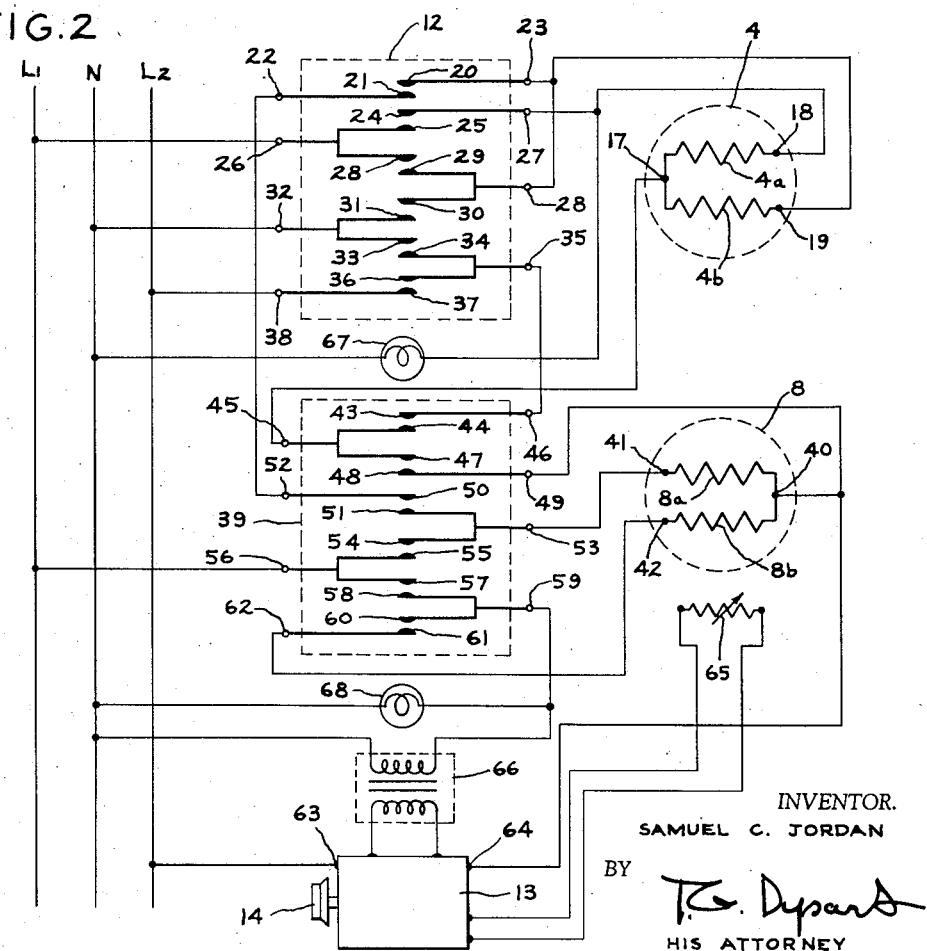
INVENTOR.
SAMUEL C. JORDAN
BY
HIS ATTORNEY

United States Patent Office 2,900,480
Patented Aug. 18, 1959

2,900,480

ELECTRIC RANGE

Samuel C. Jordan, Lyndon, Ky., assignor to General Electric Company, a corporation of New York Application November 14, 1958, Serial No. 773,979

4 Claims. (Cl. 219—20)

This invention relates to electric ranges of the type including a thermostatically controlled surface heating units, and has as its general object the provision of a range of this type including an improved control system so arranged that both the thermostatically controlled unit and a separately controlled heating unit adjacent thereto may be controlled in accordance with the temperature of a griddle heated by both units.

Further objects and advantages of the invention will become apparent as the following description proceeds, and the features of novelty which characterize the invention will be pointed out with particularity in the claims annexed to and forming a part of this specification.

Briefly stated, in accordance with one aspect of my invention I provide an electric range having a pair of adjacent surface heating units, a thermostatic control system responsive to the temperature of a utensil resting on one of the heating units, a conventional multi-wattage control system for the other heating unit, and a selector switch connected in circuit with the two systems in a novel manner so that the conventionally controlled heating unit may be connected in circuit with the thermostatic control system in such a way that both units may be operated thermostatically in response to the temperature of a griddle supported thereon. In accordance with the invention, the control circuits are so arranged that during automatic operation the conventional unit supplies a wattage well suited for griddling operations when the conventional control switch is in its "off" position and that inadvertent actuation of the switch to a heating position will merely produce a higher or lower heat and will not produce a short circuit condition.

For a better understanding of this invention reference may be made to the following description and the accompanying drawing in which:

Fig. 1 is a fragmentary elevation view partly in section of an electric range embodying our invention.

Fig. 2 is a circuit diagram showing the control system of the invention.

Referring first to Fig. 1 of the drawing, the numeral 1 designates an electric range including a cooktop 2, a backsplasher 3 at the rear thereof, and a surface cooking unit 4 supported on cooktop 2 adjacent backsplasher 3. Surface heating unit 4 may be of any well known type, but is preferably of the type including a sheathed heating unit 5 coiled in flat spiral form supported on a spider assembly 6 and provided with a reflector pan 7. Also mounted on cooktop 2 is another surface cooking unit 8 comprising a sheathed heating unit 9 coiled in flat spiral form and supported on a spider assembly 10 below which is mounted a reflector 11. To provide the usual series of wattage outputs needed during various cooking operations, heating unit 4 is energized through a wattage control switch 12 which may be a pushbutton switch of the type shown in Andrews Patent 2,431,904, a rotary switch of the type shown in Illian Patent 2,482,831 or any other suitable wattage control switch. Heating unit 8 is energized through a thermostatic control device 13 provided with a manually adjustable control knob 14 and a temperature sensing element 15 supported centrally within the innermost coil of heating element 9 so as to rest in heat transfer relation with a utensil supported on the unit.

In performing griddle type frying operations, it is particularly important that the temperature of the griddle be maintained within relatively narrow limits, and also it is desirable that the griddle have a rather large area so that a number of large items such as pancakes, for example, may be cooked simultaneously. Accordingly, there is provided a large removable griddle 16 preferably made of aluminum and adapted to rest on and to be heated by heating units 4 and 8. It is also important that the temperature of all portions of the griddle surface be substantially uniform, and in accordance with the present invention this is accomplished by means of a control system so arranged that not only heating unit 8 but also heating unit 4 is thermostatically controlled in accordance with the temperature sensed by temperature detector 15.

Referring now to the circuit diagram shown in Fig. 2, it will be seen that heating unit 4 includes a pair of resistance elements 4a and 4b which have a common terminal 17 and separate terminals 18 and 19 respectively. During cooking operations in which a cooking vessel is to be heated only by heating unit 4, energization of resistance elements 4a and 4b is controlled by means of multiple position wattage control switch 12. Switch 12, as shown in schematic form in Fig. 2, includes a pair of contacts 20 and 21 arranged to connect terminals 22 and 23, a pair of contacts 24 and 25 arranged to connect terminals 26 and 27, a pair of contacts 28 and 29 arranged to connect terminals 26 and 28, a pair of contacts 30 and 31 arranged to connect terminals 32 and 28, a pair of contacts 33 and 34 arranged to connect terminals 32 and 35, and a pair of contacts 36 and 37 arranged to connect terminals 38 and 35.

Heating unit 8 may of course be operated either separately under the control of thermostat 13 or in conjunction with heating unit 4 when a large utensil such as griddle 16 is to be heated, a selector switch 39 being provided so that the user may select the appropriate circuits required for these operations. It will be understood that switch 39 may be of any suitable type such as those shown in the aforementioned Andrews and Illian patents. In order to accommodate other cooking utensils of various sizes and to utilize the heat output of heating unit 8 most efficiently, heating unit 8 may be provided with a pair of resistance elements 8a and 8b physically arranged as separate inner and outer coils resting on spider 10 so that only the inner element need be energized if a cooking utensil of small diameter is to be heated. Accordingly, selector switch 39 is also arranged to provide means for connecting only the inner coil 8b or both the outer coil 8a and the inner coil 8b in the heating circuit completed when the contacts of thermostat 13 close. Resistance elements 8a and 8b have a common terminal 40 and separate terminals 41 and 42 respectively.

Selector switch 39 includes a pair of contacts 43 and 44 arranged to connect terminals 45 and 46, a pair of contacts 47 and 48 arranged to connect terminals 45 and 49, a pair of contacts 50 and 51 arranged to connect terminals 52 and 53, a pair of contacts 54 and 55 arranged to connect terminals 56 and 53, a pair of contacts 57 and 58 arranged to connect terminals 56 and 59, and a pair of contacts 60 and 61 arranged to connect terminals 62 and 59.

Referring briefly to thermostatic control device 13, it will be understood that an electrical circuit for energizing heating units 4 and 8 is completed through terminals 63 and 64 of thermostat 13 whenever temperature sensing device 15 is below the temperature set by adjustment of knob 14, and that thus thermostat 13 causes the heating units connected thereto to be periodically energized to maintain a predetermined temperature. For purposes of illustration, thermostat 13 has been shown as having a thermistor 65 as the temperature sensing device, the thermistor being mounted within temperature sensor 15 so that its temperature will be substantially equal to the temperature of the utensil in contact therewith. However, it will be understood that any suitable utensil responsive thermostatic control system, including systems utilizing hydraulic bulb and bellows arrangements, may be used. All-electric thermistor type control system which may be utilized in the present invention include the control system disclosed in Welch Patent 2,767,296, and the Series No. 53200 surface unit control system presently being manufactured and sold by the King-Seeley Corporation of Ann Arbor, Michigan. Each of these electric systems requires a source of low voltage power, and accordingly a low voltage transformer 66 may be provided for this purpose. The transformer is preferably connected to selector switch 39 so that it is energized when the switch is turned from its Off position to a heating position.

Referring now to the circuit connections between the various components thus far described, it will be seen that terminals 26, 32 and 38 of wattage control switch 12 are connected to lines L–1, N (neutral) and L–2 respectively of a three wire power supply (energized at 236 volts, for example) so that resistance elements 4a and 4b of heating unit 4 may be energized in various combinations of line and one-half line voltage to provide a graduated series of 5 wattage levels. It will also be seen that terminal 52 of selector switch 39 is connected to line L–1 and terminal 63 of thermostat 13 is connected to line L–2 so that either resistance element 8b of heating unit 8 or resistance elements 8a and 8b may be energized at line voltage when selector switch 39 is actuated so as to close the appropriate contacts as described below. If desired, an indicator light positioned in the vincinity of switch 12 may be connected between terminal 27 of the switch and the neutral line of the power supply so as to provide a visual signal that the switch is in a heating position, and similarly an indicator light 68 may be connected to terminal 59 of selector switch 39 and to the neutral line to perform the same function.

It will be observed that terminals 23 and 28 of switch 12 are connected directly to terminal 19 of resistance element 4b, and that terminal 27 is connected directly to terminal 18 of resistance element 4a. However, terminal 35 of switch 12 is not connected directly to common terminal 17 of heating unit 4, but instead is connected to terminal 46 of selector switch 39, and terminal 45 of switch 39 is connected to common terminal 17 of the heating unit. Thus switch contacts 43—44 of switch 39 must be closed before current may flow between either line L–2 or the neutral line and terminal 17 of the heating unit. The purpose of this connection through switch 39 is to prevent a direct short which would otherwise occur if switch 12 were actuated to a heating position requiring the closure of contacts 33—34 and selector switch 39 were actuated to the Griddle position described below, in which contacts 47—48 are closed.

For the same reason, normally open contacts 20—21 are provided in control switch 12 (the contacts are closed only when the switch is in the Off position) and connected, by means of terminals 22 and 23 in the portion of the "griddle" circuit which includes terminal 52 of selector switch 39 and terminal 19 of heating unit 4. Otherwise, a direct short might occur upon actuation of selector switch 39 to complete the griddle circuit if control switch 12 was in a heating position in which contacts 28—29 or contacts 30—31 are closed.

In the present embodiment of my invention, wattage control switch 12 is provided with the following positions; High, Second, Third, Low, Warm and Off. Selector switch 39 is provided with the following switch positions: Both Coils (resistance elements 8a, 8b), Inner Coil, (resistance element 8b), Griddle, and Off. Knob 14 of thermostat 13 is of course provided with a calibrated temperature scale or suitable indicia such as Warm, Boil and Fry or a combination of these scales. The various switch contact positions and the resulting mode of energization of the heating units is set forth in the following tables in which the various switch positions are indicated under the heading "Cooking operation," the switch contacts which are closed in the position indicated are listed under the switches identified by number, and the voltage at which the coils or resistance elements of the heating units are energized is indicated under the headings identifying the elements by number.

*Conventional heating unit 4*

| Cooking Operation | Switch 12 | Switch 39 | Element 4a | Element 8b |
|---|---|---|---|---|
| High Heat | 24—25, 28—29, 36—37 | 43—44 | 236 v | 236 v. |
| Second Heat | 24—25, 36—37 | 43—44 | 236 v | Off. |
| Third Heat | 24—25, 28—29, 33—34 | 43—44 | 118 v | 118 v. |
| Low Heat | 24—25, 33—34 | 43—44 | 118 v | Off. |
| Warm Heat | 24—25, 30—31 | 43—44 | (Both in series on 118 v.) | |
| Off | 20—21 | | Off | Off. |

*Automatic heating unit 8*

| Cooking Operation | Switch 39 | Element 8a | Element 8b |
|---|---|---|---|
| Both Coils (8a, 8b) | 43—44, 54—55, 57—58, 60—61 | 236 v | 236 v. |
| Inner Coil (8b) | 43—44, 57—58, 60—61 | Off | 236 v. |
| Off | 43—44 | Off | Off. |

*Automatic griddle circuit—units 4 and 8*

| Switch 12 | Switch 39 | Element 4a | Element 4b | Element 8a | Element 8b |
|---|---|---|---|---|---|
| 2—21 | 47—48, 50—51, 54—55, 57—58 | Off | 236 v. (cycling). | 236 v. (cycling). | Off. |

It will of course be understood that simultaneous cooking operations may be conducted on both heating unit 4 and heating unit 8, if desired. From the above tables it will be seen that contacts 43 and 44 of selector switch 39 are closed in all positions of the switch except the Griddle position and hence that when heating units 4 and 8 are being operated separately, switch 12 is connected to heating unit 4 so as to provide the same circuit connections for five different wattage levels as shown in the aforementioned Andrews patent. Under these circumstances the operation of heating unit 4 is independent of heating unit 8 and thermostat 13. As to heating unit 8, it may be operated with only its inner coil (8b) energized across lines L–1 and L–2 under the control of thermostat 13 or with both the inner and outer coils (8a, 8b) connected across lines L–1 and L–2 under thermostatic control.

When a griddling operation is to be performed using a large griddle 16 resting on both heating units, selector switch 39 is actuated to the Griddle position, it being understood that wattage switch 12 must be in the Off position if heating unit 4 is to be operated properly. However, it should be understood that no damage will be done to the control system or its components if control switch 12 is inadvertently left in or actuated to a heating position when selector switch 39 is in the Griddle position. The consequence of such inadvertence would merely be periodic energization of heating unit 4 at either too high or a too low wattage level to maintain an even temperature on griddle 16.

Assuming that wattage control switch 12 is in the Off position and selector switch 39 is actuated to its Griddle position, the following circuits will be completed each time the contacts of thermostat 13 close in response to a demand for more heat. Outer coil 8a of heating unit 8 will be energized across lines L-1 and L-2 by a circuit including terminals 63 and 64 of thermostat 13, terminals 40 and 41 of the resistance element, and switch contacts 54—55 of the selector switch. It has been found desirable to utilize only outer coil 8a during such a griddling operation, and consequently inner coil 8b is disconnected from the circuit by virtue of the fact that contacts 60—61 are open when the switch is in the Griddle position. Resistance element 4b (which is preferably arranged so as to be the outer coil of heating unit 4) is also energized across lines L-1 and L-2 by means of a circuit which includes thermostat 13, contacts 47—48 of switch 39, terminals 17 and 19 of the resistance element, switch contacts 20—21 of control switch 12, and switch contacts 50—51, 54—55 which are connected to line L-1 through terminal 56. It will be observed that resistance element 4a (preferably the inner coil) of heating unit 4 is de-energized under these conditions since contacts 24—25 of switch 12 are open when the switch is in its Off position.

From the foregoing, it will be evident that I have provided a novel and highly useful surface unit control system utilizing well known readily available switches and other components connected so as to provide a conventional multi-wattage surface unit, an automatically controlled surface unit, and an arrangement whereby both surface heating units may be energized under automatic control when a large two-unit griddle is to be heated.

While I have shown and described a specific embodiment of my invention, I do not desire the invention to be limited to the particular construction shown and described, and I intend by the appended claims to cover all modifications within the true spirit and scope of the invention.

What I claim is:

1. An electric range comprising first and second adjacent surface heating units, said first heating unit including a pair of resistance elements having a common terminal and first and second separate terminals whereby said first heating unit is adapted to be connected in circuit with a three-wire power source so as to provide a plurality of wattage outputs, a multiple-position multiple-contact control switch adapted to be connected to said power source and to said resistance elements so as to control the energization thereof, thermostatic means connected in circuit with said power source and said second heating unit for controlling the energization thereof in accordance with the temperature of a utensil supported thereon, a selector switch connected in circuit with said power source and said first and second heating units, said selector switch including a plurality of contacts arranged to provide a first switch position in which only said second heating unit is connected so as to be controlled by said thermostatic means and a second switch position in which both of said heating units are connected so as to be controlled by said thermostatic means, said selector switch also including a pair of normally closed contacts connected in circuit with said common terminal of said resistance elements and said control switch so that said common terminal may be disconnected from said control switch by actuation of said selector switch, and means for opening said normally closed contacts when said selector switch is moved to said second switch position, whereby said common terminal of said resistance elements is disconnected from said control switch when said first heating unit is connected in circuit with said thermostatic means.

2. An electric range comprising first and second adjacent surface heating units, said first heating unit including a pair of resistance elements having a common terminal and first and second separate terminals whereby said first heating unit is adapted to be connected in circuit with a three-wire power source so as to provide a plurality of wattage outputs, a multiple-position multiple-contact control switch adapted to be connected to said power source and to said resistance elements so as to control the energization thereof, thermostatic means connected in circuit with said power source and said second heating unit for controlling the energization thereof in accordance with the temperature of a utensil supported thereon, a selector switch connected in circuit with said power source and said first and second heating units, said selector switch including a plurality of contacts arranged to provide a first switch position in which only said second heating unit is connected so as to be controlled by said thermostatic means and a second switch position in which both of said heating units are connected so as to be controlled by said thermostatic means, said control switch including a pair of normally open contacts which are closed only when said control switch is in its "off" position, said pair of normally open contacts being connected in circuit with the first separate terminal of said first heating unit, said selector switch including switch means in circuit with said pair of normally open contacts for supplying power thereto when the selector switch is in its second position.

3. An electric range as defined in claim 1 in which said control switch includes a pair of normally open contacts which are closed only when said control switch is in its "off" position, said pair of normally open contacts being connected in circuit with the first separate terminal of said first heating unit, and said selector switch includes switch means in circuit with said pair of normally open contacts for supplying power thereto when the selector switch is in its second position.

4. An electric range as defined in claim 1 in which said second heating unit includes a first resistance element coiled concentrically within a second resistance element, and said selector switch includes switching means providing a first circuit in which only said first resistance element is energized, a second circuit in which both of said resistance elements are energized, and a third circuit in which only said second resistance element and said first heating unit are energized.

References Cited in the file of this patent
UNITED STATES PATENTS

| | | |
|---|---|---|
| 2,419,083 | Meyers | Apr. 15, 1947 |
| 2,550,579 | McDowell | Apr. 24, 1951 |
| 2,785,266 | Lewis et al. | Mar. 12, 1957 |